No. 668,456. Patented Feb. 19, 1901.
S. B. & J. F. RITTENHOUSE.
MOLE TRAP.
(Application filed Dec. 10, 1900.)
(No Model.)
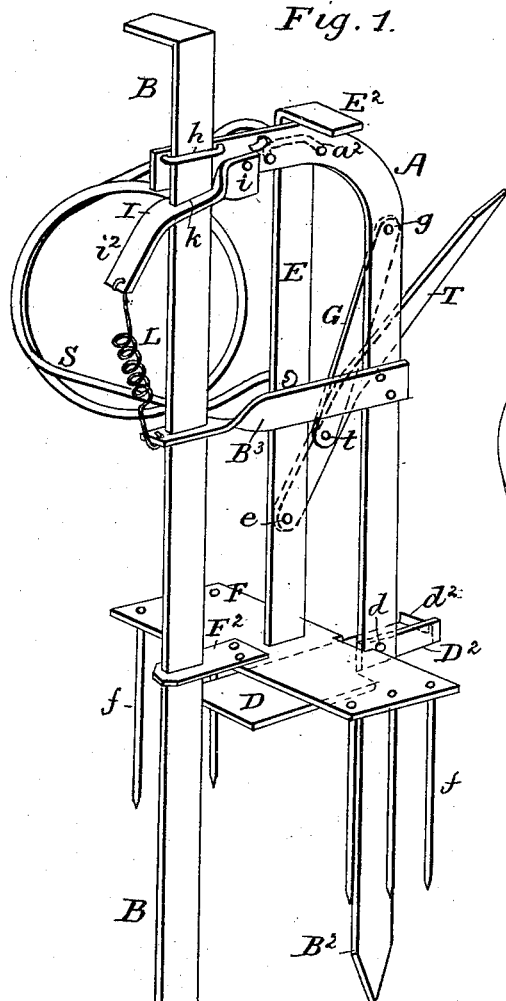
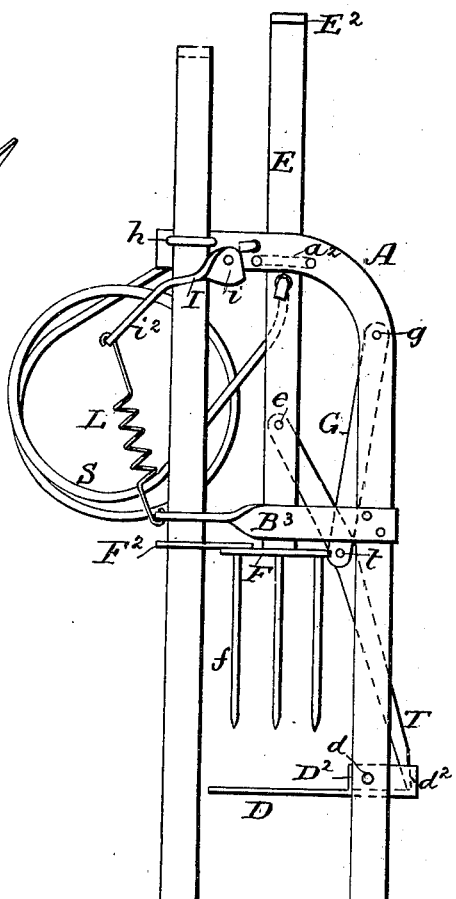
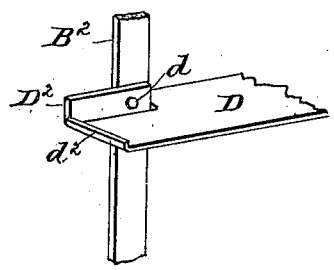
Witnesses
R. F. Storm
J. J. Masson
Inventors
Silas B. Rittenhouse
and James F. Rittenhouse
By E. E. Masson their Attorney
THE NORRIS PETERS CO., PHOTO-LITHO., WASHINGTON, D. C.

UNITED STATES PATENT OFFICE.

SILAS B. RITTENHOUSE AND JAMES FREEMAN RITTENHOUSE, OF LIBERTY MILLS, INDIANA.

MOLE-TRAP.

SPECIFICATION forming part of Letters Patent No. 668,456, dated February 19, 1901.

Application filed December 10, 1900. Serial No. 39,299. (No model.)

*To all whom it may concern:*

Be it known that we, SILAS B. RITTENHOUSE and JAMES FREEMAN RITTENHOUSE, citizens of the United States, residing at Liberty Mills, in the county of Wabash and State of Indiana, have invented certain new and useful Improvements in Mole-Traps, of which the following is a specification, reference being had therein to the accompanying drawings.

This invention relates to impalement-traps the prongs of which are intended to pierce and kill moles or other small animals, said prongs being carried by a suitable frame adapted to slide and be spring-propelled down along one of the anchoring vertical guide-rods which are thrust into the ground alongside of the burrow of the mole, the body of the trap being adjustable upon the long anchoring guide-rod to suit the nature of the ground on which the trap is to be used, whether the soil is soft or hard and dense or stony, and is an improvement upon the mole-trap for which a patent, No. 655,995, was granted to us August 14, 1900, the objects of our invention being to provide the trap with two anchoring-rods, the longest one of which serves as a guide for the spring-propelled sliding frame and the other serves not only as a pivot-support for the tripping-plate, but also as a side support for said plate, so that it can swing only in one direction—viz., toward or away from the outer end of the trigger. Therefore there is no need to handle the tripping-plate while setting the trigger in engagement therewith. We attain these objects by the construction illustrated in the accompanying drawings, in which—

Figure 1 is a perspective view of the trap unset, with the prongs-frame nearly resting upon the tripping-plate. Fig. 2 is a side view of the trap set, having the prongs-frame elevated and the trigger in engagement with the tripping-plate. Fig. 3 is a perspective view of the tripping-plate, showing its guiding side wing lying alongside of and pivoted to one of the anchoring-rods.

In said drawings, A represents the main frame of the trap, consisting of a flat bar of metal bent upon its edge like a horseshoe to obtain inexpensively a partly-arched frame, and a rod $B^2$, pointed at its lower end to be driven part way in the ground and used as an anchor for the trap. A longer rod B serves also as a guideway for the vertical sliding parts of the trap, while the rod $B^2$ has the tripping-plate D pivoted thereto upon the pin $d$ passing through its vertical wing $D^2$ and through said rod $B^2$. The flat face of the wing $D^2$ being parallel with the face of the rod $B^2$, said tripping-plate D can swing in only one direction—viz., toward or away from the outer end of the trigger T—so that the turned-up lip $d^2$ on the shorter end of the tripping-plate is always at right angles to the face of the rod $B^2$ in proper location to engage with the outer end of said trigger. For the same reason the pivoted end or inner end of the trigger T, mounted upon the pivot-pin $e$, is retained by said pin parallel with the face of its support, and consequently parallel with the face of the rod $B^2$, and thus the outer end of the trigger is adapted to always drop into engagement with the turned-up lip $d^2$ of the tripping-plate without any necessity of handling either the trigger or the tripping-plate.

The trigger is pivoted about one-third of its length at $t$ upon a pin projecting from the lower end of a connecting-rod G, the upper end of which is pivoted at $g$ to the frame A or to the upper end of its anchoring-rod $B^2$. Said rod $g$ oscillates only in one direction, and it therefore maintains the trigger T parallel with one of the faces of the rod $B^2$.

The vertically-sliding frame of the trap consists of a flat rod E, that is retained vertically connected to the frame A by means of a staple $a^2$, loosely encircling said rod E and having its ends passing through perforations made in the central portion of the partly-arched frame A. The rod E has secured in a horizontal position to its lower end a plate F, each end of which is provided with a row of prongs $f$, intended to pierce and kill any mole which may, while lifting the top of its burrow, slightly lift the outer end of the tripping-plate D and release the trigger T, the inner end of which trigger has its pivot-pin $e$ secured to the vertical rod E of the sliding frame. To guide the lower end of said rod E or its horizontal foot-plate F, the latter has secured to one of its sides an arm $F^2$, which has a rectangular slot to receive loosely the anchoring-rod B and be guided thereby.

To elevate the rod E and at its foot-plate F to set the trap, the upper end of said rod E is bent laterally, as a hook E², under which the operator can place a finger and lift it until the free end of the trigger T has been swung down and entered into engagement with the upwardly-turned lip D² of the tripping-plate.

To retain the long anchoring-rod B and the anchoring-rod B² of the frame parallel to each other, so that they can be relied upon as guides for the sliding prong-carrying plate and rod E of the trap, they are connected together with a bar B³, located above the prong-carrying plate F, said bar being double-riveted at one end to the frame A and having at the other end a slot for the passage of the anchoring-rod B. To propel said sliding plate F and its rod E, the lower end of the bent and looped wire spring S is secured to said vertical rod E, while the upper end is secured to the upper portion of the frame A. To guide the upper portion of the anchoring-rod B, a staple $h$ is secured to the side of the frame A, and said rod B is made to pass loosely between it and said frame. To adjustably secure the frame A upon the rod B, so that the latter can be driven the desired distance into the ground to anchor the trap in proper position over the run of the mole, a clutch-lever I has one end pivoted at $i$ to the side of the frame A, and the other end has a somewhat pendent handle $i^2$, the weight of which is generally sufficient to lock said lever to the narrow edges of the rod B. Said rod passes through the lever I in a slot $k$, the length of which is slightly more than the width of the face of the rod B and is thus adapted to grip the narrow edges of said rod in whatever position the clutch-lever is made to engage the edges of said rod. To insure the gripping, a coiled spring L may be used, one end of which is secured to the outer end of the handle $i^2$ and the other end to the end of the bar B³ of the frame.

Having now fully described our invention, we claim—

1. The combination of a trap-frame consisting of a flat bar bent on its edge and terminating into a flat anchoring-rod having a pointed end, a tripping-plate provided with a turned-up end, and a vertical wing resting flat against, and pivoted to said anchoring-rod, a vertically-sliding frame consisting of the flat vertical rod E and a prong-carrying plate, a staple secured to the frame and guiding the rod E, a flat-bar connecting-rod having its upper end pivoted to the arched frame, a trigger having its lower end pivoted to, and lying flat against the vertical rod E and pivoted to the connecting-rod against which it lies flat, with a flat anchoring-rod longer than the frame anchoring-rod, substantially as and for the purpose described.

2. The combination of a trap-frame having a pointed anchoring-rod, a tripping-plate provided with a turned-up end, and a vertical wing pivoted to said anchoring-rod, a prong-carrying plate and its flat carrying-rod, a staple secured to the frame and guiding said rod, a flat-bar connecting-rod having its upper end pivoted to the frame, a trigger having its lower end pivoted to the central vertical rod and also pivoted to the connecting-rod, a slidable anchoring-rod longer than the frame anchoring-rod, and a clutch-lever having one end pivoted to the frame and the other end pendent and embracing the anchoring-rod, substantially as and for the purpose described.

In testimony whereof we affix our signatures in presence of two witnesses.

SILAS B. RITTENHOUSE.
JAMES FREEMAN RITTENHOUSE.

Witnesses:
SOLOMON HEETER,
CORA MUNSON.